(12) United States Patent
Goldman-Shenhar (10) Patent No.: US 12,189,348 B2
(45) Date of Patent: Jan. 7, 2025

(54) GENERATION AND PRESENTATION OF EXPLANATIONS RELATED TO BEHAVIOR OF AN AUTOMATED CONTROL SYSTEM

(71) Applicant: GM GLOBAL TECHNOLOGY OPERATIONS LLC, Detroit, MI (US)

(72) Inventor: Claudia Goldman-Shenhar, Mevasseret Zion (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1025 days.

(21) Appl. No.: 17/153,414

(22) Filed: Jan. 20, 2021

(65) Prior Publication Data

US 2022/0230081 A1 Jul. 21, 2022

(51) Int. Cl.
| | |
|---|---|
| *G05B 13/00* | (2006.01) |
| *B60W 50/14* | (2020.01) |
| *B60W 60/00* | (2020.01) |
| *G05B 13/02* | (2006.01) |
| *G06N 5/045* | (2023.01) |
| *G06N 7/01* | (2023.01) |

(52) U.S. Cl.
CPC ......... *G05B 13/0265* (2013.01); *B60W 50/14* (2013.01); *B60W 60/00* (2020.02); *B60W 2050/146* (2013.01); *G06N 5/045* (2013.01); *G06N 7/01* (2023.01)

(58) Field of Classification Search
CPC ............ G05B 13/0265; G05B 19/0423; G05B 2219/25257; B60W 50/14; B60W 60/00; B60W 2050/146; B60W 2050/0029; B60W 2540/215; G06N 5/045; G06N 7/01; B60K 2360/161; B60K 2360/175; B60K 35/00; B60K 35/28; B60K 35/654
See application file for complete search history.

(56) References Cited

U.S. PATENT DOCUMENTS

| | | | | |
|---|---|---|---|---|
| 9,376,117 B1* | 6/2016 | Parundekar | ......... | B60W 50/087 |
| 2010/0286867 A1* | 11/2010 | Bergholz | ............... | B60K 35/00 |
| | | | | 701/36 |
| 2014/0136187 A1* | 5/2014 | Wolverton | ............... | G10L 15/22 |
| | | | | 704/9 |

(Continued)

FOREIGN PATENT DOCUMENTS

| | | | | |
|---|---|---|---|---|
| CN | 108369767 B | * | 12/2021 | ............. G06F 3/012 |
| EP | 3261081 A1 | * | 12/2017 | ............. B64D 43/00 |
| WO | WO-2020119995 A1 | * | 6/2020 | ............. G10L 15/22 |

*Primary Examiner* — Peter D Nolan
*Assistant Examiner* — Peter Y Ning
(74) *Attorney, Agent, or Firm* — CANTOR COLBURN LLP (57) ABSTRACT

A system for generating and presenting an explanation to a user includes an input module configured to receive sensor data and input the sensor data to a control system of an automated system, the control system configured to control operation of the automated system based on the sensor data and according to a gray box decision making algorithm. The system also includes an explanation module configured to generate an explanation of a decision made by the control system and a corresponding behavior of the automated system, the explanation generated based on at least one of: a request by the user, and a user model, and a display module configured to present the generated explanation to the user.

20 Claims, 4 Drawing Sheets

(56) References Cited

U.S. PATENT DOCUMENTS

| | | | |
|---|---|---|---|
| 2017/0162197 A1* | 6/2017 | Cohen | G10L 15/22 |
| 2018/0072323 A1* | 3/2018 | Gordon | B60W 30/095 |
| 2019/0355353 A1* | 11/2019 | Shin | G10L 15/1815 |
| 2020/0193311 A1* | 6/2020 | Myers | G06N 5/045 |
| 2020/0218263 A1* | 7/2020 | Amir | G06N 5/045 |
| 2020/0402658 A1* | 12/2020 | Tomsett | G06N 3/08 |
| 2021/0240190 A1* | 8/2021 | Wray | G06F 40/186 |
| 2023/0186125 A1* | 6/2023 | Goldman-Shenhar | G06N 5/045 706/12 |
| 2023/0289632 A1* | 9/2023 | Liao | G06N 5/022 |
| 2023/0325628 A1* | 10/2023 | Nisimov | G06N 3/0464 706/21 |
| 2023/0325640 A1* | 10/2023 | Thewes | G06N 3/09 706/21 |
| 2024/0119317 A1* | 4/2024 | Hazard | G06N 5/045 |

\* cited by examiner

GENERATION AND PRESENTATION OF EXPLANATIONS RELATED TO BEHAVIOR OF AN AUTOMATED CONTROL SYSTEM

INTRODUCTION

The subject disclosure relates to the art of user interaction with automated driving or operating systems. More particularly, the subject disclosure relates to a system and method for presenting explanations of automated driving behaviors to a user.

Vehicles are increasing equipped with automated driving systems that provide various levels of automation. For example, vehicles can feature full autonomous control, semi-autonomous control, and autonomous control of specific vehicle functions (e.g., braking or steering). Semi-automated and fully automated driving behaviors are determined in part by decision making algorithms. As the decision making process is not fully known by the user, there can be situations in which a user is unsure as to why a behavior occurs. For example, an automated control system may perform a maneuver to avoid a detected vehicle or object that is not visible to a driver, or automated control system limitations can cause the vehicle to behave in an unexpected manner. Such situations can result in user concern and erode user confidence in automated and semi-automated vehicles.

SUMMARY

In one exemplary embodiment, a system for generating and presenting an explanation to a user includes an input module configured to receive sensor data and input the sensor data to a control system of an automated system, the control system configured to control operation of the automated system based on the sensor data and according to a gray box decision making algorithm. The system also includes an explanation module configured to generate an explanation of a decision made by the control system and a corresponding behavior of the automated system, the explanation generated based on at least one of: a request by the user, and a user model, and a display module configured to present the generated explanation to the user.

In addition to one or more of the features described herein, the generated explanation includes a pre-determined explanation selected based on an operating context, the operating context based on automated system dynamics data and one or more features of an environment around the automated system.

In addition to one or more of the features described herein, the generated explanation is based on a probabilistic explanation algorithm, the explanation algorithm indicating whether the generated explanation is to be presented and a time at which the generated explanation is to be presented.

In addition to one or more of the features described herein, the explanation algorithm is an extension of the gray box decision making algorithm.

In addition to one or more of the features described herein, the user model indicates a probability that the user will be concerned in response to a determined operating context, and the explanation module is configured to output the generated explanation to the display module based on the probability being greater than a selected threshold.

In addition to one or more of the features described herein, the system further includes an explanation filter module, the explanation filter module configured to adjust at least one of a length and a timing of the generated explanation, based on the user model.

In addition to one or more of the features described herein, the explanation module is configured to generate the generated explanation based on a Markov Decision Process (MDP).

In addition to one or more of the features described herein, the generated explanation is selected from at least one of: a myopic explanation, an explanation series, a contrastive explanation, a semantic explanation, and a user-centered explanation.

In one exemplary embodiment, a method of generating and presenting an explanation to a user includes receiving sensor data and inputting the sensor data to a control system of an automated system, the control system configured to control operation of the automated system based on the sensor data and according to a gray box decision making algorithm. The method also includes generating, by an explanation module, an explanation of a decision made by the control system and a corresponding behavior of the automated system, the explanation generated based on at least one of: a request by the user, and a user model, and presenting the generated explanation to the user.

In addition to one or more of the features described herein, the generated explanation includes a pre-determined explanation selected based on an operating context, the operating context based on automated system dynamics data and one or more features of an environment around the automated system.

In addition to one or more of the features described herein, the generated explanation is based on a probabilistic explanation algorithm, the explanation algorithm indicating whether the generated explanation is to be presented and a time at which the generated explanation is to be presented.

In addition to one or more of the features described herein, the explanation algorithm is an extension of the gray box decision making algorithm.

In addition to one or more of the features described herein, the user model indicates a probability that the user will be concerned in response to a determined operating context, and the generated explanation is presented based on the probability being greater than a selected threshold.

In addition to one or more of the features described herein, method further includes an explanation filter to adjust at least one of a length and a timing of the generated explanation, based on the user model.

In addition to one or more of the features described herein, the generated explanation is based on a Markov Decision Process (MDP).

In addition to one or more of the features described herein, the generated explanation is selected from at least one of: a myopic explanation, an explanation series, a contrastive explanation, a semantic explanation, and a user-centered explanation.

In one exemplary embodiment, a vehicle system includes a memory having computer readable instructions, and a processing device for executing the computer readable instructions. The computer readable instructions control the processing device to perform receiving sensor data and inputting the sensor data to a control system of an automated system, the control system configured to control operation of the automated system based on the sensor data and according to a gray box decision making algorithm. The computer readable instructions also control the processing device to perform generating, by an explanation module, an explanation of a decision made by the control system and a corresponding behavior of the automated system, the explanation generated based on at least one of: a request by a user, and a user model, and presenting the generated explanation to the user.

In addition to one or more of the features described herein, the generated explanation includes a pre-determined explanation selected based on an operating context, the operating context based on automated system dynamics data and one or more features of an environment around the automated system.

In addition to one or more of the features described herein, the generated explanation is based on a probabilistic explanation algorithm, the explanation algorithm indicating whether the generated explanation is to be presented and a time at which the generated explanation is to be presented.

In addition to one or more of the features described herein, the user model indicates a probability that the user will be concerned in response to a determined operating context, and the generated explanation is presented based on the probability being greater than a selected threshold.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems are provided for generating and/or presenting explanations of actions or behaviors of an automated system. The explanations provide insight as to why an automated system behaves in a certain way, thereby reducing stress on a user and increasing confidence in the automated system. An "automated system" may be any device or system having automated control capabilities. In an embodiment, the automated system is part of an automated or semi-automated vehicle having a control system configured to control the vehicle according to one or more levels of automation. An explanation system is provided to present explanations of behavior in order to mitigate user concern and increase confidence in the automated system. The explanation system may present explanations proactively and/or in response to a user request (manual request).

Although the following description is in the context of a vehicle, embodiments described herein are not so limited and can be realized in conjunction with any of various devices and systems having automated behaviors (automated systems). Examples of such devices or systems include aircraft, factory or manufacturing machinery, robotics, construction vehicles, smart home devices, internet-of-things devices, and others.

An embodiment of an explanation system is configured to receive one or more decisions from an automated control system, and present an explanation to a user, such as a driver and/or passenger in an automated or semi-automated vehicle. In an embodiment, the automated control system utilizes a gray box algorithm to make control decisions. A gray box algorithm, such as an artificial intelligence planning algorithm, specifies an artificial intelligence decision making process that computes actions or behaviors, and is affected by uncertainties, cost functions, dynamic information and/or operating contexts.

In an embodiment, a processing device or module configured as an explanation system computes explanations of automated behaviors that may occur in various driving or operating contexts. An "operating context" includes any combination of conditions and features that can affect driving or operating behavior. An operating context may include features of the environment around a vehicle or other automated system, which may include the physical surrounding and features and conditions thereof (e.g., other vehicles, pedestrians, road type, intersections, traffic control devices, road conditions, time of day, weather, etc.). The operating context may also include other conditions, such as a condition of the user (e.g., distracted, stressed, eyes away from the road, transitioning to manual control, etc.) and vehicle dynamics (e.g., stationary, at a given speed, braking, accelerating, turning, etc.). The explanation system also includes an explanation algorithm that is used to determine whether an explanation is to be presented, the type of explanation, the amount of information to be presented via an explanation, and/or a preferred time at which the explanation is presented.

An explanation may be presented in response to a user request, or proactively selected by the explanation system based on selected criteria. In an embodiment, the explanation system utilizes a user model to generate, select and/or present an explanation proactively if the user model indicates that it is likely that a given operating context will cause concern, and thus a user would like or benefit from an explanation to mitigate this concern.

Explanations can be presented using one or more of various modalities, including a visual modality (e.g., graphics and/or textual explanation) and/or an auditory modality (e.g., an audible explanation). Other modalities may be used to convey information and/or enhance the effectiveness of explanations by alerting the user that an explanation is being presented. Such modalities include auditory modalities (e.g., a beep, tone, or series thereof), haptic modalities (e.g., steering wheel and/or seat vibration) and/or visual modalities (e.g. control of interior lighting). The combination and/or features of one or more modalities may be used in any manner suitable to alert the user and/or to present an explanation.

Embodiments described herein present a number of advantages. For example, the explanation system provides an effective way to mitigate user concerns regarding the behavior of an automated system. The explanation system provides information as to why a certain driving behavior is occurring or will occur (and may also explain why one behavior was selected over another). Explanations provided by the explanation system can provide information to clarify automated behavior, which can mitigate user concern while also educating the user about the capabilities, limitations and correct behavior of the automated system. In many situations, there is a level of uncertainty in the environment, and a user may not be appraised of all of the factors or conditions that cause a given behavior (e.g., there may be other vehicles or features not visible to the user). In such situations, the user may not be aware of the reasons why a behavior was selected, which can result in unnecessary concern and stress. The explanation system can mitigate such concern and stress by providing information to the user regarding the vehicle's decision process. In addition to alleviating concern, the explanation system can increase user confidence in automated systems.

Figure 1:
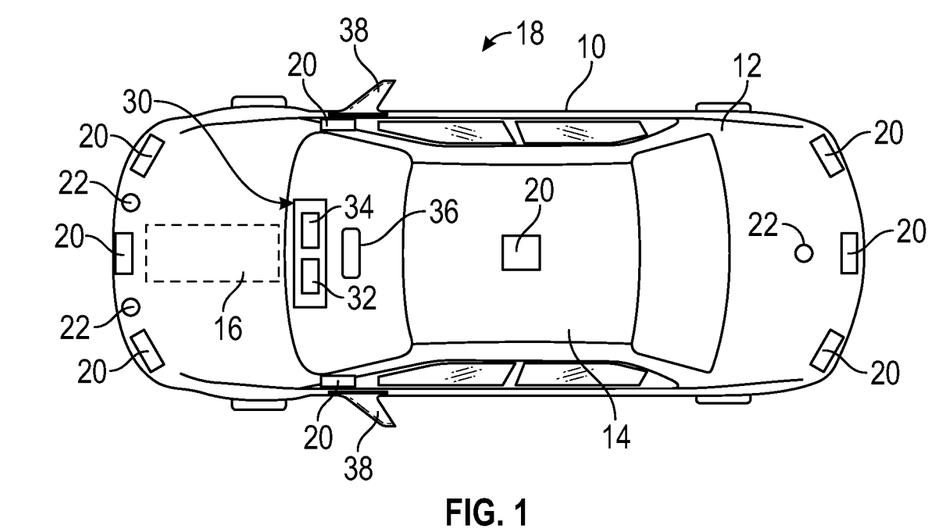
FIG. 1 is a top view of a motor vehicle including aspects of an explanation system, in accordance with an exemplary embodiment.

FIG. 1 shows an embodiment of a motor vehicle 10, which includes a vehicle body 12 defining, at least in part, an occupant compartment 14. The vehicle body 12 also supports various vehicle subsystems including a powertrain system 16 (e.g., combustion, electrical, and other), and other subsystems to support functions of the engine system 16 and other vehicle components, such as a braking subsystem, a steering subsystem, and others.

The vehicle also includes a monitoring, detection and automated control system 18, aspects of which may be incorporated in or connected to the vehicle 10. The control system 18 in this embodiment includes one or more optical cameras 20 configured to take images, which may be still images and/or video images. Additional devices or sensors may be included in the control system 18, such as one or more radar assemblies 22 included in the vehicle 10. The control system 18 is not so limited and may include other types of sensors, such as infrared.

The vehicle 10 and the control system 18 include or are connected to an on-board computer system 30 that includes one or more processing devices 32 and a user interface 34. The user interface 34 may include a touchscreen, a speech recognition system and/or various buttons for allowing a user to interact with features of the vehicle. The user interface 24 may be configured to interact with the user via visual communications (e.g., text and/or graphical displays), tactile communications or alerts (e.g., vibration), and/or audible communications. The on-board computer system 30 may also include or communicate with devices for monitoring the user, such as interior cameras and image analysis components. Such devices may be incorporated into a driver monitoring system (DMS).

In addition to the user interface 34, the vehicle 10 may include other types of displays and/or other devices that can interact with and/or impart information to a user. For example, in addition to, or alternatively, the vehicle 10 may include a display screen (e.g., a full display mirror or FDM) incorporated into a rearview mirror 36 and/or one or more side mirrors 38. In one embodiment, the vehicle 10 includes one or more heads up displays (HUDs). Other devices that may be incorporated include indicator lights, haptic devices, interior lights, auditory communication devices, and others. Haptic devices (tactile interfaces) include, for example, vibrating devices in the vehicle steering wheel and/or seat. The various displays, haptic devices, lights, and auditory devices are configured to be used in various combinations to present explanations to a user (e.g., a driver, operator or passenger).

The vehicle 10, in an embodiment, includes an explanation system, which may be incorporated into the on-board computer system 30 or in communication with the computer system 30. In addition, or alternatively, the explanation system can be incorporated into a remote processing device such as a server, a personal computer, a mobile device, or any other suitable processor.

Figure 2:
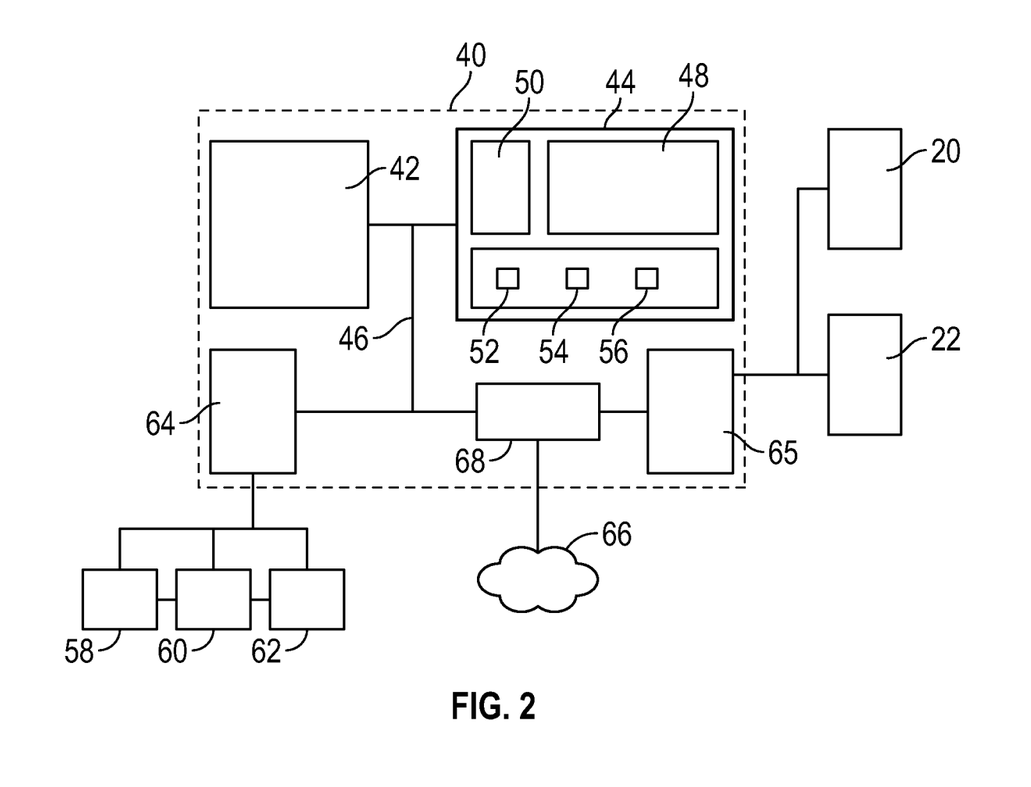
FIG. 2 depicts a computer system configured to perform aspects of generating and/or presenting explanations of a behavior of an automated system, in accordance with an exemplary embodiment.

FIG. 2 illustrates aspects of an embodiment of a computer system 40 that is in communication with, or is part of, the control system 18 and/or the explanation system, and that can perform various aspects of embodiments described herein. The computer system 40 includes at least one processing device 42, which generally includes one or more processors for performing aspects of image acquisition and analysis methods described herein. The processing device 42 can be integrated into the vehicle 10, for example, as the on-board processing device 32, or can be a processing device separate from the vehicle 10, such as a server, a personal computer or a mobile device (e.g., a smartphone or tablet).

Components of the computer system 40 include the processing device 42 (such as one or more processors or processing units), a system memory 44, and a bus 46 that couples various system components including the system memory 44 to the processing device 32. The system memory 44 may include a variety of computer system readable media. Such media can be any available media that is accessible by the processing device 42, and includes both volatile and non-volatile media, and removable and non-removable media.

For example, the system memory 44 includes a non-volatile memory 48 such as a hard drive, and may also include a volatile memory 50, such as random access memory (RAM) and/or cache memory. The computer system 40 can further include other removable/non-removable, volatile/non-volatile computer system storage media.

The system memory 44 can include at least one program product having a set (e.g., at least one) of program modules that are configured to carry out functions of the embodiments described herein. For example, the system memory 44 stores various program modules that generally carry out the functions and/or methodologies of embodiments described herein. An input module 52 may be included to perform functions related to acquiring detection and monitoring data used to make automated decisions. An explanation module 54 may be included for analysis of received decisions, as well as generation and/or selection of explanations. A display module 56 may be included for displaying explanations to a user. The system 40 is not so limited, as other modules may be included. The system memory 44 may also store various data structures, such as data files or other structures that store data related to imaging and image processing. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 42 can also communicate with one or more external devices 58 such as a keyboard, a pointing device, and/or any devices (e.g., network card, modem, etc.) that enable the processing device 42 to communicate with one or more other computing devices. In addition, the processing device 42 may communicate with one or more devices such as the cameras 20 and the radar assemblies 22. The processing device 42 may communicate with one or more display devices 60 (e.g., an onboard touchscreen, cluster, center stack, HUD, mirror displays (FDM) and others), and vehicle control devices or systems 62 (e.g., for partially autonomous (e.g., driver assist) and/or fully autonomous vehicle control). Communication with various devices can occur via Input/Output (I/O) interfaces 64 and 65.

The processing device 42 may also communicate with one or more networks 66 such as a local area network (LAN), a general wide area network (WAN), and/or a public network (e.g., the Internet) via a network adapter 68. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

Figure 3:
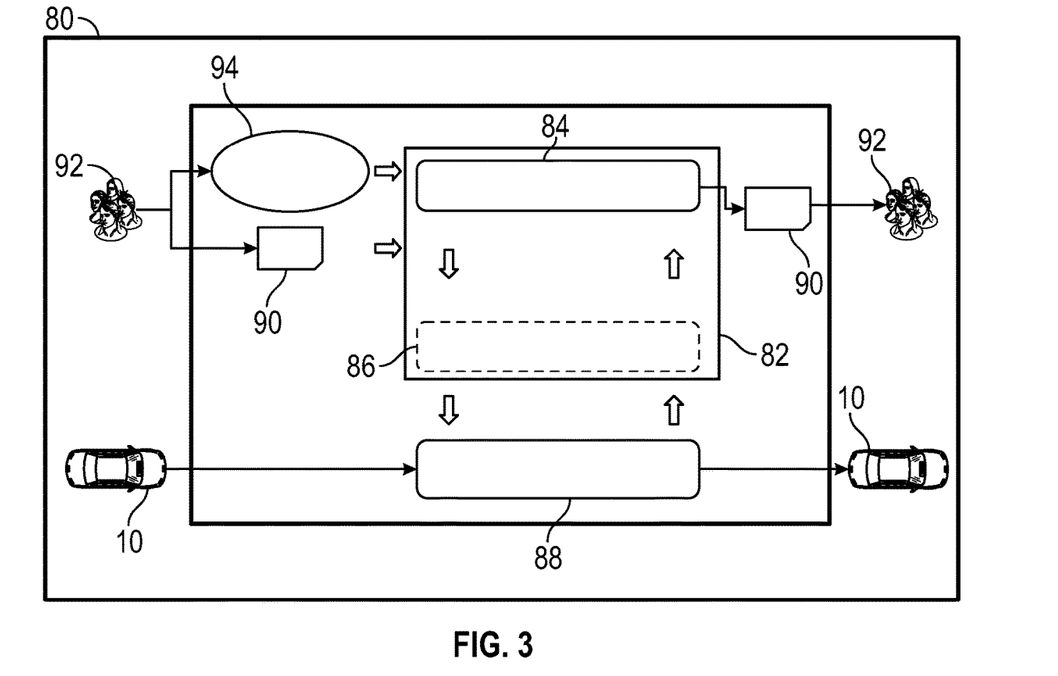
FIG. 3 depicts a system for presenting explanations to a user regarding a behavior of an automated system, in accordance with an exemplary embodiment.

FIG. 3 depicts an embodiment of a system 80 for making automated control decisions, and presenting explanations to a user regarding automated behaviors and/or actions, to reduce or mitigate user concern and provide insight to the user as to why a behavior is occurring. An explanation can be provided at or near the time that a behavior occurs, prior to the behavior occurring, and/or thereafter. For example, an explanation can be provided contemporaneous with the behavior or a planning decision (e.g., during driving), and/or can be provided to a user device (e.g., mobile device) as part of a summary of behaviors and/or decisions. In this embodiment, the automated control system is part of a vehicle, but is not so limited. The system 80 is configured to perform a method of generating and/or presenting explanations as discussed below.

The system 80 may be incorporated as part of a vehicle control system, a control system of an other automated device or system, or otherwise as part of any suitable processing device or system. For example, all or part of the system 80 is incorporated into the vehicle 10 and is configured to communicate with the vehicle's automated control system.

The system 80 provides functionality to explain the reason(s) for a given automated behavior or provide insight into the decision making process that results in the behavior. In other words, the system 80 presents explanations to a user that provide insight as to why the behavior is occurring. A "behavior" may include one or more actions, a planning decision, a decision not to perform an action, an observation, recognition of other vehicles and objects, and or any other activity performed by or prompted by an automated control system. For example, explanations can be provided regarding planned behaviors, intentions to execute behaviors, reasons for why a certain behavior was executed or why it was not executed, information known to an automated control system that prompted certain behaviors, and others.

The system 80 can be used in conjunction with various levels of automated control. Examples of control levels include full user control, full autonomous control, semi-autonomous control, and autonomous control of specific vehicle functions (e.g., braking or steering).

In an embodiment, the system 80 is configured to present explanations regarding decisions of a control system that utilizes an artificial intelligence algorithm for decision making under some level of uncertainty. The algorithm assumes or determines the state of an environment, assumes a cost function, and computes a plan (including a sequence of one or more actions) that brings a vehicle (or other automated entity) from an initial state to a goal state with a minimal cost function. For example, an initial state can be that a vehicle is moving toward a stop sign at a certain speed, the goal state can be at a stop at the stop sign, and the plan specifies actions including decelerating and braking to a stop.

In an embodiment, as noted above, the automated control system utilizes an artificial intelligence algorithm referred to as a "gray box" algorithm. Examples of gray box algorithms include planning algorithms such as Markov Decision Process algorithms, A* search algorithms and Monte Carlo search trees.

Referring again to FIG. 3, in an embodiment, the system 80 includes an artificial intelligence (AI) based explanation system 82, which includes an explanation agent or explanation engine 84, and an abstraction layer 86. The explanation system 82 is in communication with a control device or system that includes an automated vehicle planning module (planner) 88. The planner 88 receives inputs from sensors in the vehicle 10, and uses a gray box algorithm such as a Markov Decision Process algorithm to make control decisions and formulate a plan. The plan is output to the automated control system in the vehicle 10 as an action or series of actions.

The planner 88, in formulating a plan of action, can encounter uncertainties. Uncertainties can result from various conditions, such as uncertainties in the detection of objects or features in the surrounding environment, such as vulnerable road users (e.g., pedestrians) and other road users (e.g., other vehicles). Uncertainties can also arise from limitations in sensors (e.g., failures, incomplete training sets, etc.), as well as uncertainties in control algorithms. As such, detections and actions prescribed by the planner 88 may come with confidence levels.

The planner 88 outputs information to the abstraction layer, including the current operating state, a description of the action(s), and confidence levels. Due to levels of uncertainty, the planner 88 generates confidence levels associated with control decisions and actions, and outputs the confidence levels to the abstraction layer 86. The abstraction layer 86 aggregates received states, confidence levels and actions, and inputs the same to the explanation engine 84. Other inputs to the explanation engine 84 may include vehicle dynamics, user models and user behavior (e.g., from a driver monitoring system)

The system 80 includes a user interface 90, such as a touch screen, keyboard and/or audio interface. The user interface 90 can be used by a user 92 (e.g., driver or passenger) to input information, to request an explanation and/or receive explanations. For example, a touchscreen in the vehicle 10 can display a button (e.g., a "why" button) that allows the user to quickly request an explanation for an action or maneuver, and thereafter display an explanation.

In response to a request from the user (or proactively as discussed further herein), the explanation engine 84 computes explanations for an action or plan, and may also compute a time at which the explanation is presented. For example, depending on user preferences or other factors such as the urgency of an action, the explanation agent may present the explanation immediately or at some time after the action is performed.

An explanation can take various forms. For example, an explanation can indicate to a user that another action was considered but not performed (e.g., to alleviate user concern when the vehicle 10 performs an unexpected maneuver), display a series of actions to help the user understand a series of events, and/or provide a semantic explanation that explains one or more factors that contribute to control decisions. The explanation may also be customized for a user or group of users. For example, one user may wish to receive explanations in a given environment (e.g., a highway) while another user does not wish to receive explanations in a similar environment. Customization can be achieved by receiving user preferences, or by monitoring the situations in which a user requests an explanation. In an embodiment, a user model is generated and maintained, which may be used to determine whether an explanation is to be displayed, the type of explanation, amount of information and/or timing of the explanation.

In automated systems that utilize machine learning and/or other artificial intelligence processes, there may be a gap between a user's expectations and an actual behavior, which can cause confusion and/or concern. This gap may be more pronounced in automated systems that utilize gray box algorithms, as uncertainty built into the algorithms, as well as dynamic environments, can make the decision process even more opaque.

The system 80 can mitigate customers concern about automated behaviors by means of explanations computed for intelligent decision making algorithms and systems. The system 80 may present an explanation to a user in response to a user request, or proactively present an explanation based on a user condition and/or a condition of an environment. Explanations may be optimized for time and content based on user information, such as a user model of concern.

The system 80 can generate an explanation based on various conditions or circumstances. For example, an explanation may be generated in response to a user request, or automatically generated in response to criteria. In an embodiment, the system 80 can include or communicate with a user's model of concern (user model) 94. Generally, the user model 94 is used to inform the explanation system 82 as to situations and contexts in which an explanation should be presented (or not presented). In an embodiment, the user model is a probabilistic model that provides a probability that a user would be concerned (and therefore would like an explanation) given vehicle dynamics and a context state.

Explanations can be provided to users while driving or post driving, for example, through a mobile app, to educate users about automated driving maneuvers. Explanations can be provided to developers and engineers, for example, while debugging or calibrating an automated control system. Explanations can also be used to help system designers design and publish system limitations and manuals.

In addition to using the user model 94 in providing explanations, the user model 94 can be used to serve as a measurement of expected anxiety, concern or discomfort in various contexts, and use this result as a trigger to other personalized behaviors of an automated system. If the user model indicates that a user is concerned and would like an explanation, systems in the vehicle 10 can be adjusted to help alleviate any associated stress. Adjustments can be made, for example, to seat position, windows, heating and cooling systems, scents, and driving style settings.

The following is a description of an example of a gray box decision making algorithm that can be used by the planner 88 or other planning module to make automated vehicle control decisions. In this example, the decision making algorithm includes a Markov Decision Process. It is noted that this is only an example, as other algorithms can be used.

A Markov decision process (MDP) is a discrete-time stochastic control process, which provides a mathematical framework for modeling decision making under conditions in which outcomes are partly random and partly under the control of a decision maker (the planner).

An embodiment of the MDP process is defined by the tuple <S, A, P, R>. In the tuple, S is a set of context states s, where each context state s corresponds to a driving or operating context. A context state s may be defined by various factors, including vehicle location, vehicle dynamics (e.g., speed, direction, etc.), and features of the surrounding environment (e.g., road type, intersection, road condition, weather conditions, presence of vulnerable road users or other objects, presence of other vehicles, etc.). Other factors may include user condition (e.g., whether the user is agitated or distracted), and capabilities and limitations of an automated control system (e.g., autonomous, semi-autonomous, maneuvers available to the control system such as parking and turning actions).

A is a set of predefined actions a that are available given the set S of context states s. The actions a are prescribed by the planner 88 and executed by the vehicle control system. The actions a may be part of a sequence of actions (i.e., a plan) prescribed by the planner 88 in a given context state s. Examples of actions include braking, stopping, steering, turning, emergency maneuvers, accelerating, changing lanes and others.

P is a probabilistic transition function that provides a probability of transitioning from a first state s to a second state or goal state s' given an action α. This function provides a probability that an action α will lead to a change from the state s to the state s'. and can be represented as:

$$P(s'|s,\alpha)$$

R is a reward function that represents a value after transitioning from state s to state s' due to the execution of an action α. The reward function considers the cost of performing an action as compared to the utility of performing the action.

The planner 88 (or other processing device) utilizes the MDP process to generate a policy during vehicle operation that prescribes the action or series of actions to be taken in a given context.

The MDP can be solved, for example, using a dynamic programming approach to determine an optimal policy π(s) for transitioning from state s to state s'. The optimal policy maximizes the value V(s) at each state s':

$$V(s) := \sum_{s'} P_{\pi(s)}(s, s')(R_{\pi(s)}(s, s') + \gamma V(s'))$$

$$\pi(s) := \operatorname{argmax}_a \left\{ \sum_{s'} P(s' \mid s, a)(R(s' \mid s, a) + \gamma V(s')) \right\}$$

In the above, the optimal policy is the one that maximizes the value of its chosen action at each state.

$P_{\pi(s)}(s,s')$ is the transition function between an initial state s and a goal state s' for a policy $\pi(s)$. $R_{\pi(s)}(s,s')$ is the reward function after transitioning.

FIGS. 4-7 depict flow diagrams that are illustrative of aspects of the overall method of generating and/or presenting explanations described above. The overall method may include all of the methods 100, 110, 120 and 130 shown in FIGS. 4-7, or may include fewer than all of the methods. Each method 100, 110, 120 and 130 is represented by a flow diagram, in which steps or stages are represented as blocks. Each method 100, 110, 120 and 130 may be performed in the order presented but is not so limited.

Figure 4:
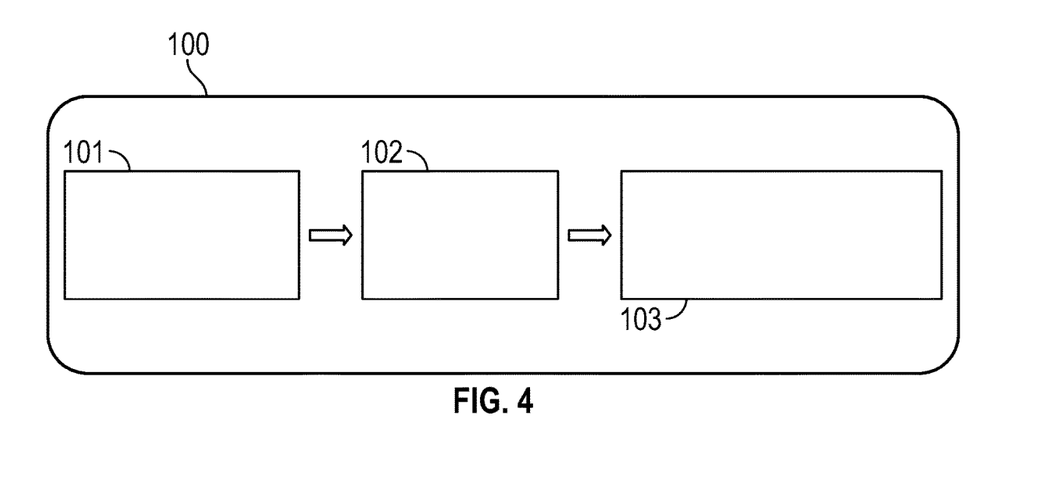
FIG. 4 is a flow diagram depicting aspects of a method of generating a user model and proactively presenting an explanation of an action performed or planned by an automated control system, in accordance with an exemplary embodiment.

FIG. 4 depicts a method 100 of generating, maintaining and/or updating a user model, such as the user model 94. The user model is used to determine if and when an explanation is to be presented to a user, and may also be used to determine the type of explanation to be presented.

In an embodiment, the user model 94 is a computational model that predicts a probability Pr that an action performed by an automated system in a given context state s will result in high concern by the user. The user model 94 outputs a probability value represented by Pr(explanation|t,s), which indicates the probability of concern in a context state s at a time t.

The method 100 includes acquiring data relevant to the user model 94, including the operating context, vehicle dynamics and/or user behavior (block 101). At block 102, the acquired data is input to the user model 94 so that the model learns probabilities of concern under various context states. User behavior may be monitored during driving to detect contexts in which the user is concerned. For example, the explanation system 82 can detect under which contexts a user actively requests an explanation, and correspondingly increase the probability value for that context. In addition, or alternatively, the user can input preferences that indicate the contexts in which the user is likely to be concerned.

At block 103, during operating or driving, the explanation system 82 monitors the operating state to detect contexts corresponding to high concern (the probability value is above a selected threshold). If such a context is detected, the explanation system 82 proactively selects an explanation for presentation to the user. It is noted that the probability may be affected by the time value relative to the decision or performance of the plan. User preferences can be acquired to determine when a user would like an explanation, and the probability can be based on the time preferred by the user.

The user model 94 may be any data structure that allows the explanation system 82 to determine the probability, such as a lookup table, decision tree and others. In an embodiment, the user model is an if-then rule model based on context, in which the user model provides an explanation in response to a given context. For example, if the context is that the vehicle 10 is approaching a stop sign, traffic light and/or intersection, the user model prescribes that an explanation for a behavior (e.g., slowing to an intermediate speed before stopping) be provided. In other contexts, an explanation may not be provided (e.g., lane change if there are few vehicle and user view is unobstructed). The explanation may be provided, for example, if an automated behavior in a given context differs from normal or expected behavior. For example, the explanation may emphasize that the vehicle 10 is considering a stop action when the user might not experience enough deceleration and might be concerned if the vehicle 10 is planning a stop ahead.

The user model 94 can be personalized for the user by logging manual requests for explanation in various operating or driving contexts, so that an explanation is provided when similar contexts arise.

The user model 94 can also present an explanation in unusual contexts or in contexts that are not typically encountered. Such contexts are referred to as "critical contexts." The user model 94 can maintain a record of the driving pattern usually kept by the user and maintain a record of usual driving patterns. If a context presents a scene that is different from the usual patterns, or that requires an automated driving behavior to be different from usual (e.g., a maneuver to avoid an accident or vulnerable road user), the user model 94 identifies the context as a critical context and assigns a high probability to that context.

The user model 94 may be created or generated offline (i.e., before the explanation system 82 is operating during driving). During driving, the user model 94 may be updated (online). For example, during driving, the explanation system 82 can monitor user requests for explanation, identify critical contexts, and monitor the user to update probabilities in the model. The user can be monitored for example, by using a driving monitoring system (DMS) to identify contexts in which the user is agitated, emotional or distracted and increase probability for such contexts.

Figure 5:
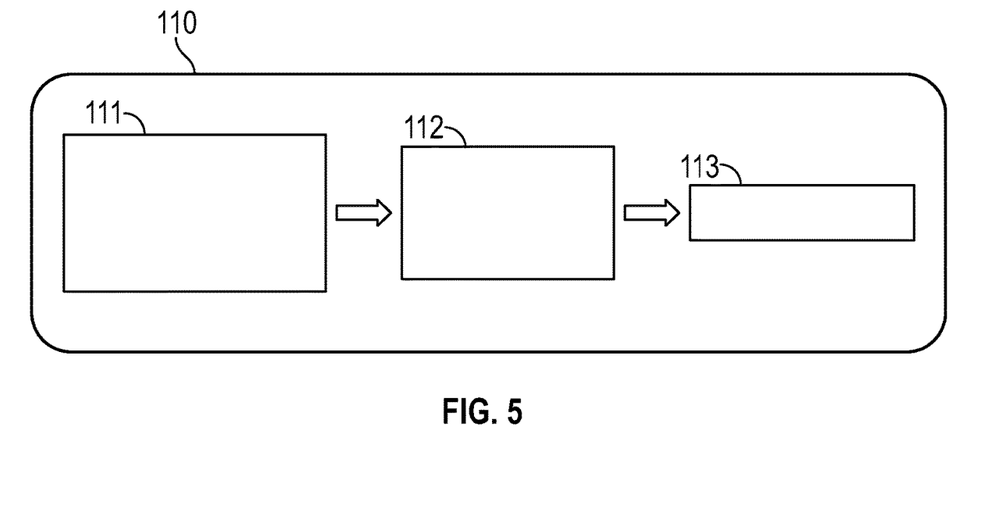
FIG. 5 is a flow diagram depicting aspects of a method of generating explanations via an explanation engine, in accordance with an exemplary embodiment.

FIG. 5 depicts an embodiment of a method 110 of configuring an automated explanation engine and generating explanations. The method 110 can be used to pre-configured and store explanations for various combinations of operating contexts (e.g., context states s) and behaviors (actions or series of actions a). In the method 110, the explanation engine 84 (or other suitable processing device or module) receives input data including driving contexts, vehicle dynamics, planning system decisions, and optimization criteria (block 111). Examples of optimization criteria include explanation length (minimized length or less than a maximum length), computational complexity (minimal computational complexity), and information capacity (maximal). Other optimization criteria include, for example, user interpretability (maximal interpretability) and amount of confusion created in a user (minimal confusion). Optimization criteria such as interpretability and confusion can be derived, for example, via user input, a user model and/or monitoring user engagement with explanations. Based on the above input data, the explanation engine 84 computes explanations for various contexts (block 112). The computed explanations are then output to a storage location as, for example, a look up table (block 113).

The explanation system 82 can provide a variety of types of explanations. Examples of such types include myopic explanations, explanation series, contrastive explanations, semantic explanations, and user-centered or customized explanations.

A "myopic explanation" provides a description to the user of an action considered but not chosen (e.g., the action being the second best option). This may be useful in situations where the user does not prefer detailed explanations or descriptions of the decision process, but instead wants confirmation that the behavior is deliberate by the automated control system.

An "explanation series" is an explanation that describes all or some of a series of actions performed according to a control decision or plan. This type of explanation indicates actions performed to achieve a desired state. In some instances, there may be many actions in a series. As such, the explanation series may be limited to a selected number of actions to avoid an overly complex explanation. The length and/or complexity of the series can be derived from user preferences or monitoring the user.

A "contrastive explanation" presents to the user alternative actions that were considered but not taken. This can be useful, for example, when the user expects one action, but a different action is performed (e.g., because of an object or vehicle not visible to the user). The contrastive explanation can help reassure the user by showing the user actions that were considered but not taken.

A "semantic explanation" is an explanation that provides a semantic concept understandable to the user. For example, an explanation may include an action coupled with a contextual description to enhance the user's understanding as to why the action was performed. For example, a myopic explanation may be "braking," while a semantic explanation may be "braking due to low visibility" or "braking due to a vehicle stopping ahead."

A "user centered" explanation is an explanation selected from a set of explanations provided for a context. The user centered explanation is selected from the set of explanations based at least in part on a user model or user preferences. The timing of the user centered explanation may be computed at the same time that the content of the explanation is computed.

In an embodiment, a myopic explanation is generated based on an extension of the above MDP decision algorithm, referred to as an "explainable myopic MDP." This method extends the above MDP algorithm by, after finding an optimal action $\alpha^*$ for a given context state, storing another action (referred to as action $\alpha'$) for that state that reached a value $V_{i+1}$ that is less than or equal to the value of the optimal action $a^*$, and is higher than all remaining actions (referred to as actions $\alpha''$) in the set of actions A. This process can be represented by the following tuple:

Explainable Myopic MDP=<S, A, P, R, E>

E is a set of explanations, including an explanation e computed for each state s (given an optimal action $\alpha^*$). For each state s, the corresponding value V(s) is computed, and the explanation associated with the action $\alpha'$ is stored in E (the set of explanations).

Whenever an action $\alpha^*$ is chosen for execution, the Explainable Myopic MDP presents the alternative action $\alpha'$ that was not chosen for execution but was the closest to the optimal action $\alpha^*$ eventually performed.

In this embodiment, the value of an action a can be derived using a value iteration process represented by:

$$V_{i+1}(s) := \max_a \left\{ \sum_{s'} P_a(s' \mid s)(R_a(s, s') + \gamma V_a(s')) \right\}$$

An explanation series can be derived, in an embodiment, using an extension of the MDP algorithm, which is referred to herein as an "explainable series MDP. This algorithm extends the algorithm for solving an MDP by storing the path of optimal actions leading from initial state so to a current state s:

Explainable Series MDP=<S, A, P, R, E>.

E is a set of explanations computed for each state s from the initial state so up to the current state s, and can be represented as:

$$E(s) = \{\alpha^*(s_0), \alpha^*(s_1), \ldots, \alpha^*(s)\}$$

$\alpha^*$ is the optimal action returned by the optimal policy P at a state $s_i$. Adding the corresponding state to an explanation can provide contextual information needed by a human to understand the full series:

$$E(s) = \{(s_0, \alpha^*(s_0)), (s_1, \alpha^*(s_1)), \ldots, (s, \alpha^*(s))\}$$

The optimal policy computed (offline) includes all possible explanations for all possible actions. During online execution of this policy, the explainable series MDP algorithm stores, for each state $s_i$ encountered, the best action performed. In this embodiment, the explanation system 82 also keeps track of the states and actions visited during execution. Each time an explanation is required to be presented at state s, the actual series of states and actions until that point can be presented.

This solution can become very complex due to the length of the series, and the complexity in understanding such combinations of actions. Thus, user preferences regarding the level of complexity can be collected to evaluate the length of the series, that is, the history for each a* is the optimal history for users to understand the context of a* choice "Contrastive" explanations may be derived by extending the MDP algorithm to store a set of K alternative actions at each state s that reached the K best values for that state s, and have values that are less or equal than the value of the optimal action a*, but highest among all possible options. This algorithm is referred to as an "explainable contrastive MDP" algorithm and is represented by:

Explainable Contrastive MDP=<S, A, P, R, E>, where the set of explanations is $E(s) = \{\alpha_{i1}, \ldots, \alpha ik\}$, such that $V(s, \alpha_1)$ is less than or equal to $V(s, \alpha^*)$, and for all other actions $\alpha''$ in the set A, each one of these K actions $\alpha_i$ reached $V(s, \alpha_i) > V(s, \alpha'')$.

For each state, when its value V(s) is computed, the K actions $\alpha_i$ are stored in E, where $\alpha_i$ is not $\alpha^*$, $V(s, \alpha_i) \le V(s, \alpha^*)$, and for all other actions $\alpha''$ in A, $\alpha''$ is not $\alpha^*$ and $\alpha''$ is not $\alpha_i$, and $V(s, \alpha_i) > V(s, \alpha'')$.

In this solution, whenever an action $\alpha^*$ is chosen for execution, the explainable contrastive MDP presents the user with the K alternative actions that were not chosen for execution but were the closest to the best action eventually performed. Each time the algorithm computes V(s), it also computes E(s) as a set of K actions such that $\alpha_i$ is not $\alpha^*$, V(s) for $\alpha_i$ is smaller than V(s) for $\alpha^*$, but there exists at least another action a in the set A for which V(s) for $\alpha_i$ is higher.

The K+1 actions (action $\alpha^*$ and the number K of actions $\alpha_i$) may be sorted as discussed above by their values V(s), by selecting the first K+1 actions for E. In another embodiment, the actions can be sorted by a value function related to understandability. In this way, the K+1 actions can be selected that are more interpretable for a user. For example, the alternative actions can be sorted by an understandability score. For example, some actions may differ from the optimal action a* that are more extreme. A stop action might not have been chosen as $\alpha^*$, but showing the user K actions considered, including braking at different rates, are less important to mitigate his concern, rather than presenting him with a stop action that was indeed considered but not chosen as the optimal action to be executed by the vehicle 10. Thus, the understandability score can be assigned to alternative actions that are more relevant to a user's concerns and/or more understandable.

"Semantic explanations" may be selected using the MDP algorithm, by adding a step to be performed prior to solving the MDP. For example, all actions in A can be classified with some semantic concept understandable by users.

Examples of such concepts include braking actions, speeding up actions, turning actions and others. Other classifications can be created with added contexts, for example, braking in high traffic, braking towards intersection, braking due to low visibility and others.

The semantic classification may be performed manually by annotation. Alternatively, classifications can be automatically assigned, for example, by machine learning classifiers.

In an embodiment, semantic explanations are generated or selected using an extension of the MDP algorithm, which includes storing a set of explanations E that are relevant semantically to the optimal action $\alpha^*$ chosen for execution. This algorithm can be represented by:

Explainable Semantic MDP=<S, A, P, R, E>, where $E(s)=\{\alpha_{i1}, \ldots, \alpha_{ik}\}$ such that $V(s,\alpha_i) \leq V(s,\alpha^*)$ and all $\alpha_i$ and $\alpha^*$ belong to the same semantic category.

During execution of $\alpha^*$ at a state s, the explanations stored in E(s) may be presented as alternatives not chosen under the same semantic category identified in $\alpha^*$.

"User centered" explanations can be determined using an extension of the MDP algorithm that computes not only the policy of action but it also computes a policy for explanations, represented by:

Explainable User Centered_MDP=<S, A, P, R, E>,

This algorithm computes, as discussed above, the action policy that maximizes the value of a state for any state and chooses the optimal action that attains the highest value at that state.

In addition, the explainable user centered MDP computes a policy of explanation such that for each state s, it chooses from a set of explanations E (including a null explanation), the explanation that attains the highest value at a particular state s when $\alpha^*$ is the optimal action.

The value of a state is extended to be the value of a state given an action is performed and an explanation is presented.

Figure 6:
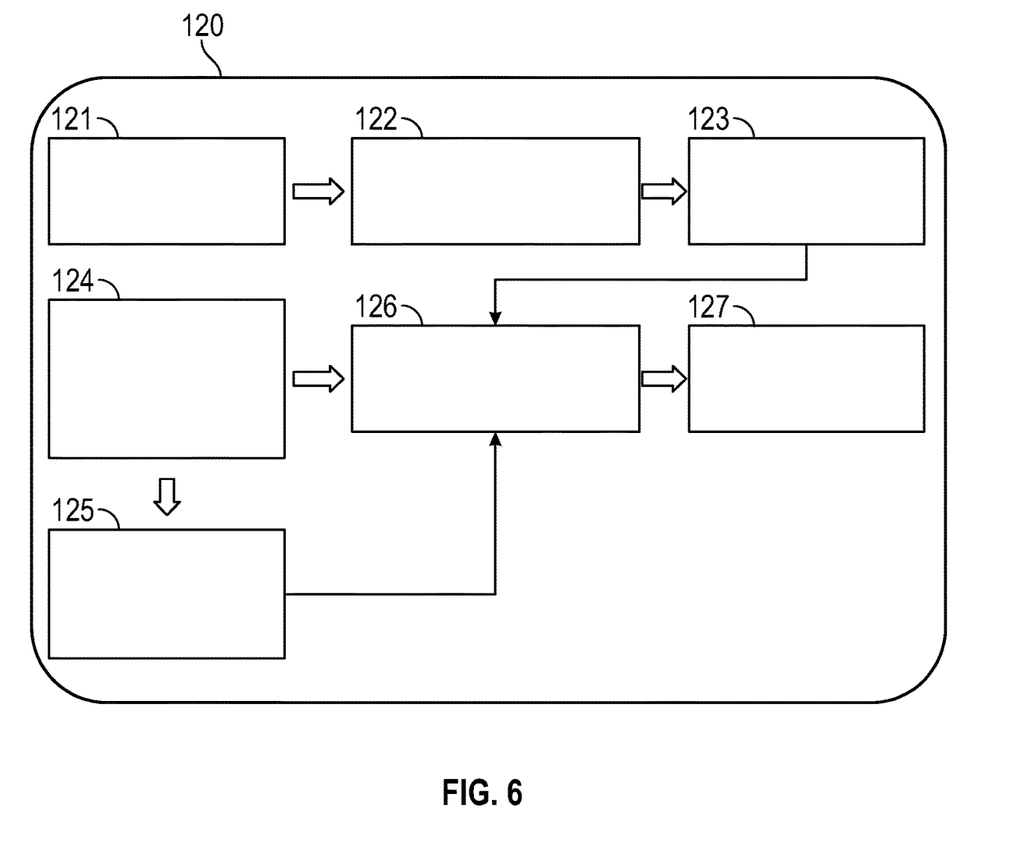
FIG. 6 is a flow diagram depicting aspects of a method of presenting an explanation of an action or behavior performed or planned by an automated control system, in accordance with an exemplary embodiment.

FIG. 6 depicts an embodiment of a method 120 for generating and/or presenting an explanation to a user.

At block 121, an automated control system generates a plan and executes an action or series of actions. A user manually requests an explanation, by interacting with a UI (block 122). The manual request may be entered in any suitable manner, for example, by performing a gesture, using a spoken request, or pressing a button (e.g., a "why" button on a steering wheel, or a button on a touchscreen).

The explanation engine 84 receives the request at block 123. At this stage, the explanation engine 84 considers the request as an immediate request. Input data is acquired at block 124 and is input to the explanation system (block 125), which generates an explanation as discussed above.

In an embodiment, prior to presenting the explanation to the user, the request and the explanation is input to an explanation filter at block 126. The explanation filter, based on a user model or other user information, can adjust the length, complexity (e.g., number of actions in a series explanation) and timing of the explanation. For example, a user may prefer that an explanation is not immediately provided, but is instead provided at a later time, which may be reflected in the user model. In another example, a user may prefer to limit the length of an explanation. Thus, the explanation filter system may delay the output of an explanation (block 127), or truncate the explanation based on user preferences.

Figure 7:
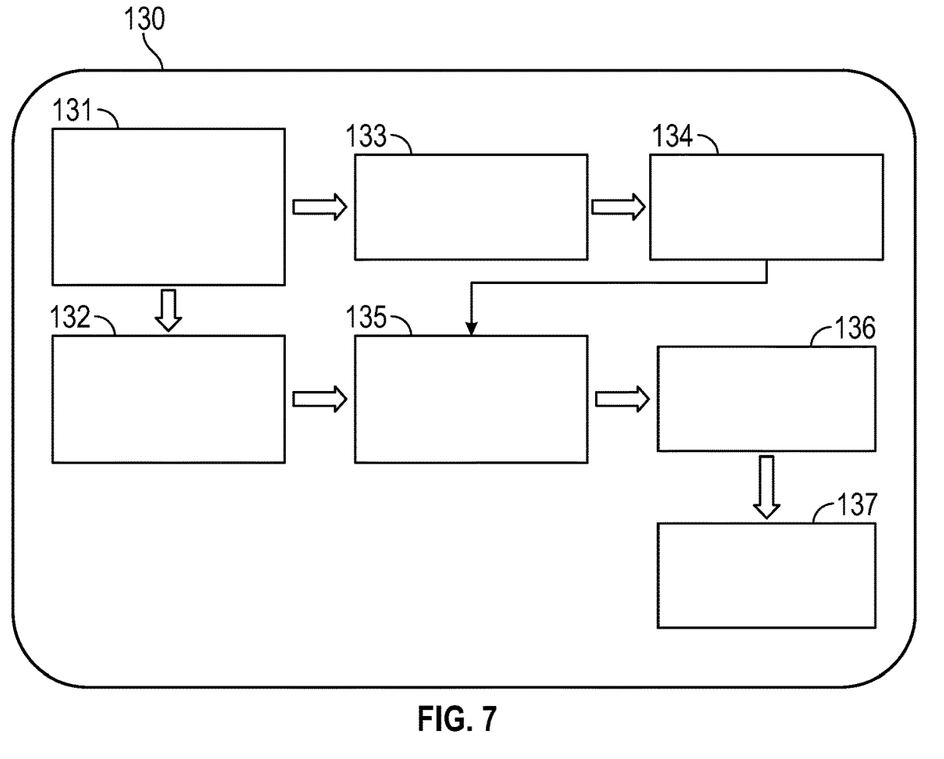
FIG. 7 is a flow diagram depicting aspects of a method of presenting an explanation of an action or behavior performed or planned by an automated control system, in accordance with an exemplary embodiment.

FIG. 7 depicts an embodiment of a method 130 for generating and/or presenting an explanation to a user. In this embodiment, the explanation is not prompted by a user directly, but is instead automatically presented if the explanation satisfies criteria specified by the user model.

At block 131, an automated control system generates a plan and executes an action or series of action, and input data including the plan (as well as the context, vehicle dynamics and optimization criteria) is acquired. At block 132, the input data is input to the explanation engine 84, which returns an explanation as discussed above.

At block 133, the input data is input to a user model, which calculates the probability that an action specified by the planning system is of high concern to the user. If the probability is sufficiently high (block 134), the explanation is input an explanation filter system at block 135. The explanation filter, as discussed above, may adjust the length, complexity and/or timing of the explanation.

The adjusted explanation is then output to a UI at block 136. In an embodiment, the explanation and context are fed to the explanation module and the explanation module may be updated accordingly (block 137).

Figure 8:
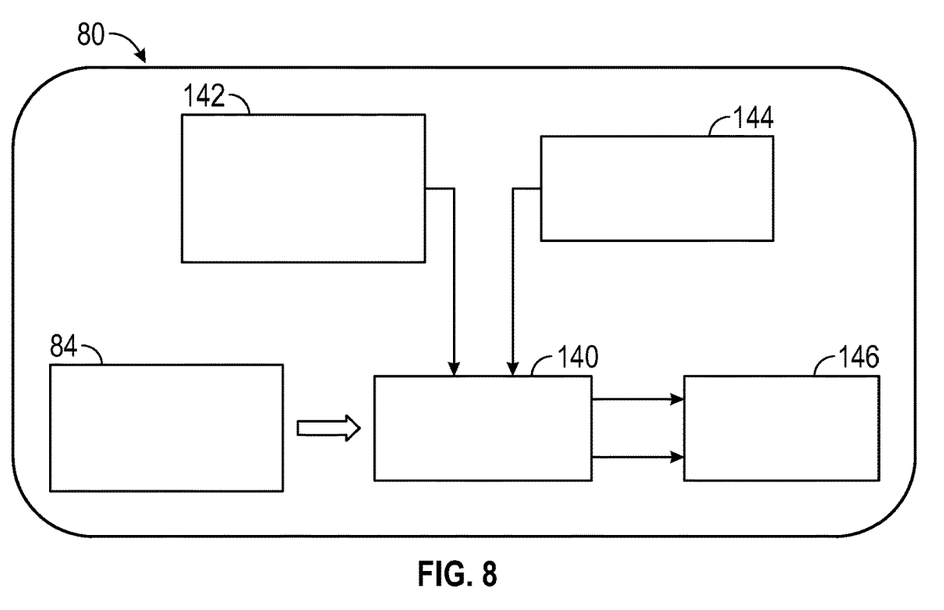
FIG. 8 depicts an explanation system including an automated explanation engine and an explanation filter system, in accordance with an exemplary embodiment

FIG. 8 illustrates an embodiment of the system 80, which includes the explanation engine 84 and an explanation filter system 140 that includes an explanation filter. In this embodiment, the system 80 is configured to provide a proactive explanation, but may also provide an explanation in response to a user request.

The explanation engine 84 outputs one or more explanations using, for example, an MDP explanation algorithm. The explanation filter system 140 receives input data 142 including context, vehicle dynamics, planning system decisions and optimization criteria. In addition, the explanation filter system 140 receives user data 144 including a user model or relevant parts thereof, user preferences, and/or user attention or user monitoring data. The explanation filter system 140 consults the user data to determine whether or not the one or more explanations are to be presented to the user. If it is determined that the one or more explanations are to be presented, the explanation filter system 140 provides an output 146 that includes the one or more explanations. The explanation filter system may also adjust the explanation(s) as discussed above.

The following is an example of types of explanations that can be presented by the system 80. The following explanations may be presented textually and/or audibly, and may be accompanied by other modalities, such as touch, haptic, lights, ambience, or any combination of these in vehicle-embedded systems, in a vehicle cabin, at an exterior and/or interior of a vehicle (doors, windows), in a digital device in the vehicle and/or any user personal digital device In this example, the context is that the vehicle 10 is moving at a given speed and is approaching a traffic light. The vehicle 10 chooses first to decelerate to a lower speed as the vehicle 10 approaches the traffic light. Although the vehicle is decelerating, the user may be concerned that the vehicle 10 is not decelerating enough for the vehicle 10 to stop in time.

A myopic explanation may be presented as "vehicle chose not to stop." This action was calculated as the optimal action, where the next best option would be to stop. The user can infer that stopping was considered but the vehicle to slow instead.

A series explanation may be "since last stop, vehicle has accelerated and is now decelerating." This explanation presents a series of actions (stop, accelerated, decelerating). A contrastive explanation may be "Vehicle chose not to stop, nor make a lane change, nor accelerate."

A semantic explanation provides additional understandable explanation that provides additional contextual information. In this example, the sematic explanation may be "vehicle is decelerating because it is approaching a traffic light intersection," or "vehicle chose to decelerate because we are approaching a traffic light intersection, with enough space to reach a full stop."

A user centered explanation may be the same or similar to the semantic explanation. However, a user model may indicate that the user does not want an explanation in this context, thus the explanation system provides no explanation at this point, or delay the explanation until later. At a later context (the vehicle is close to the traffic light), the explanation system may provide an explanation such as "getting to a full stop soon before the traffic lights intersection."

The following description provides examples of different contexts and illustrates operation of the explanation system 82.

In a first example, the vehicle 10 (the ego vehicle) is driving autonomously in the right-most lane of a six-lane highway. The ego vehicle is following multiple vehicles in the right-most lane, but cannot change to the adjacent lane, because the vehicle in the adjacent lane is not driving fast enough relative to the ego vehicle's speed. In this case, the automated control system of the ego vehicle is limited in that the design specifications do not allow the ego vehicle to check other lanes to make a lane change.

Thus, although other lanes may be open, the ego vehicle chooses not to make a lane change to the open lane. This choice is due to a limitation in the automated control system that the ego vehicle can make a lane change only when it is slowing down and the vehicle speed at the adjacent lane is higher than a threshold speed. If that threshold is not reached, the ego vehicle will not move to the adjacent lane. The driver in the ego vehicle expects a lane change (e.g., may expect the ego vehicle to move to another lane beyond the adjacent lane) but is unaware of limitations of the system design.

In this example, the explanation system 82 proactively computes and presents an explanation to inform the driver that there is a limitation and that the ego vehicle cannot autonomously make a lane change at the current time. The explanation system 82 may, if applicable, inform the user that only a manual lane change is available at this point.

In a second example, the ego vehicle is driving in the same highway as the first example, but the ego vehicle is operating in a semi-autonomous mode in which the automated control system controls the speed and the driver controls the steering, or the automated controls the steering and the driver controls the speed. The driver is speeding up during a turning maneuver, and expects the vehicle to keep controlling the steering. The ego vehicle is limited by its control and physical systems, and above some speed it will no longer be able to control the steering as expected and the automated control system disengages (transfers the full control to manual). The explanation system 82 computes an explanation to tell the driver there is a limitation and only manual control is possible at this state.

In a third example, the ego vehicle is driving in a sub-division road, and an unexpected parked car is detected. The only lane to keep driving on is shared with vehicles coming in the opposite direction. In this situation, the ego vehicle may have uncertainty regarding the environment ahead of the parked car due to an occluded view, and therefore may not attempt a lane change until further information is acquired. At the same time, the driver may have a better view, leading the driver to believe that an immediate lane change could be performed. Thus, the behavior of the ego vehicle (i.e., waiting to attempt a lane change) may not conform with the driver's expectations.

In the third example, the driver may be in an uncertain situation, not knowing what automated behavior to expect, while knowing himself what he would do in that situation if he had manual control. The explanation system 82 in this example computes an explanation to tell the driver what the plan is and what is the level of certainty and confidence the automated control system has.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for generating and presenting an explanation to a user, comprising:
    an input module configured to receive sensor data and input the sensor data to a control system of an automated system, the control system configured to control the automated system based on the sensor data and according to a gray box decision making algorithm;
    an explanation module configured to determine an operating context associated with a control operation, and generate an explanation of a decision made by the control system and a corresponding behavior of the automated system, the explanation automatically generated based on a user model of concern, the user model of concern indicating a probability that the user will be concerned in response to the determined operating context; and
    a display module configured to present the generated explanation to the user.

2. The system of claim 1, wherein the generated explanation includes a pre-determined explanation selected based on an operating context, the operating context based on automated system dynamics data and one or more features of an environment around the automated system.

3. The system of claim 1, wherein the generated explanation is based on a probabilistic explanation algorithm, the explanation algorithm indicating whether the generated explanation is to be presented and a time at which the generated explanation is to be presented.

4. The system of claim 3, wherein the explanation algorithm is an extension of the gray box decision making algorithm.

5. The system of claim 1, wherein the explanation module is configured to output the generated explanation to the display module based on the probability being greater than a selected threshold.

6. The system of claim 5, further comprising an explanation filter module, the explanation filter module configured to adjust at least one of a length and a timing of the generated explanation, based on the user model.

7. The system of claim 1, wherein the explanation module is configured to generate the generated explanation based on a Markov Decision Process (MDP).

8. The system of claim 1, wherein the generated explanation is selected from at least one of: a myopic explanation, an explanation series, a contrastive explanation, a semantic explanation, and a user-centered explanation, the selecting based on the user model of concern.

9. A method of generating and presenting an explanation to a user, comprising:
receiving sensor data and inputting the sensor data to a control system of an automated system, the control system configured to control the automated system based on the sensor data and according to a gray box decision making algorithm;
determining an operating context associated with a control operation;
generating, by an explanation module, an explanation of a decision made by the control system and a corresponding behavior of the automated system, the explanation automatically generated based on a user model of concern, the user model of concern indicating a probability that the user will be concerned in response to the determined operating context; and
presenting the generated explanation to the user.

10. The method of claim 9, wherein the generated explanation includes a pre-determined explanation selected based on an operating context, the operating context based on automated system dynamics data and one or more features of an environment around the automated system.

11. The method of claim 9, wherein the generated explanation is based on a probabilistic explanation algorithm, the explanation algorithm indicating whether the generated explanation is to be presented and a time at which the generated explanation is to be presented.

12. The method of claim 11, wherein the explanation algorithm is an extension of the gray box decision making algorithm.

13. The method of claim 9, wherein the generated explanation is presented based on the probability being greater than a selected threshold.

14. The method of claim 13, further comprising using an explanation filter to adjust at least one of a length and a timing of the generated explanation, based on the user model.

15. The method of claim 9, wherein the generated explanation is based on a Markov Decision Process (MDP).

16. The method of claim 9, wherein the generated explanation is selected from at least one of: a myopic explanation, an explanation series, a contrastive explanation, a semantic explanation, and a user-centered explanation, the selecting based on the user model of concern.

17. A vehicle system comprising:
a memory having computer readable instructions; and
a processing device for executing the computer readable instructions, the computer readable instructions controlling the processing device to perform:
receiving sensor data and inputting the sensor data to a control system of an automated system, the control system configured to control operation of the automated system based on the sensor data and according to a gray box decision making algorithm;
determining an operating context associated with a control operation;
generating, by an explanation module, an explanation of a decision made by the control system and a corresponding behavior of the automated system, the explanation automatically generated based on at least one of: a request by a user, and a user model of concern, the user model of concern indicating a probability that the user will be concerned in response to the determined operating context; and
presenting the generated explanation to the user.

18. The vehicle system of claim 17, wherein the generated explanation includes a pre-determined explanation selected based on an operating context, the operating context based on automated system dynamics data and one or more features of an environment around the automated system.

19. The vehicle system of claim 17, wherein the generated explanation is based on a probabilistic explanation algorithm, the explanation algorithm indicating whether the generated explanation is to be presented and a time at which the generated explanation is to be presented.

20. The vehicle system of claim 17, wherein the generated explanation is presented based on the probability being greater than a selected threshold.

\* \* \* \* \*